United States Patent [19]

Beer et al.

[11] 4,170,527
[45] Oct. 9, 1979

[54] PRODUCTION OF ELECTROLYTIC MANGANESE DIOXIDE

[75] Inventors: Henri B. Beer, Heide Kalmthout; Theo L. H. Muller, Wuustwezel, both of Belgium

[73] Assignee: Diamond Shamrock Technologies S.A., Geneva, Switzerland

[21] Appl. No.: 955,314

[22] Filed: Oct. 27, 1978

[30] Foreign Application Priority Data

Oct. 2, 1977 [GB] United Kingdom ............... 45607/77

[51] Int. Cl.² .............................................. C25B 1/00
[52] U.S. Cl. .................................................... 204/96
[58] Field of Search ........................................... 204/96

[56] References Cited

U.S. PATENT DOCUMENTS

| 3,844,912 | 12/1974 | Shuin | 204/96 |
| 3,855,088 | 12/1974 | Kosaka | 204/96 |
| 4,069,116 | 1/1978 | Dzhaparidze et al. | 204/96 |

Primary Examiner—R. L. Andrews
Attorney, Agent, or Firm—John P. Hazzard

[57] ABSTRACT

In the production of electrolytic manganese dioxide, the anodically-deposited product is removed by cathodically polarizing the electrode, possibly assisted by impact or vibration. Typically, the current is reversed periodically when the deposit is about 100–1500μ thick and shortly after current reversal, the product peels off as flake-like particles which can easily be ground to form a battery de-polarizer. An apparatus for use in carrying out the removal of the desired product from electrodes is disclosed and illustrated.

20 Claims, 2 Drawing Figures

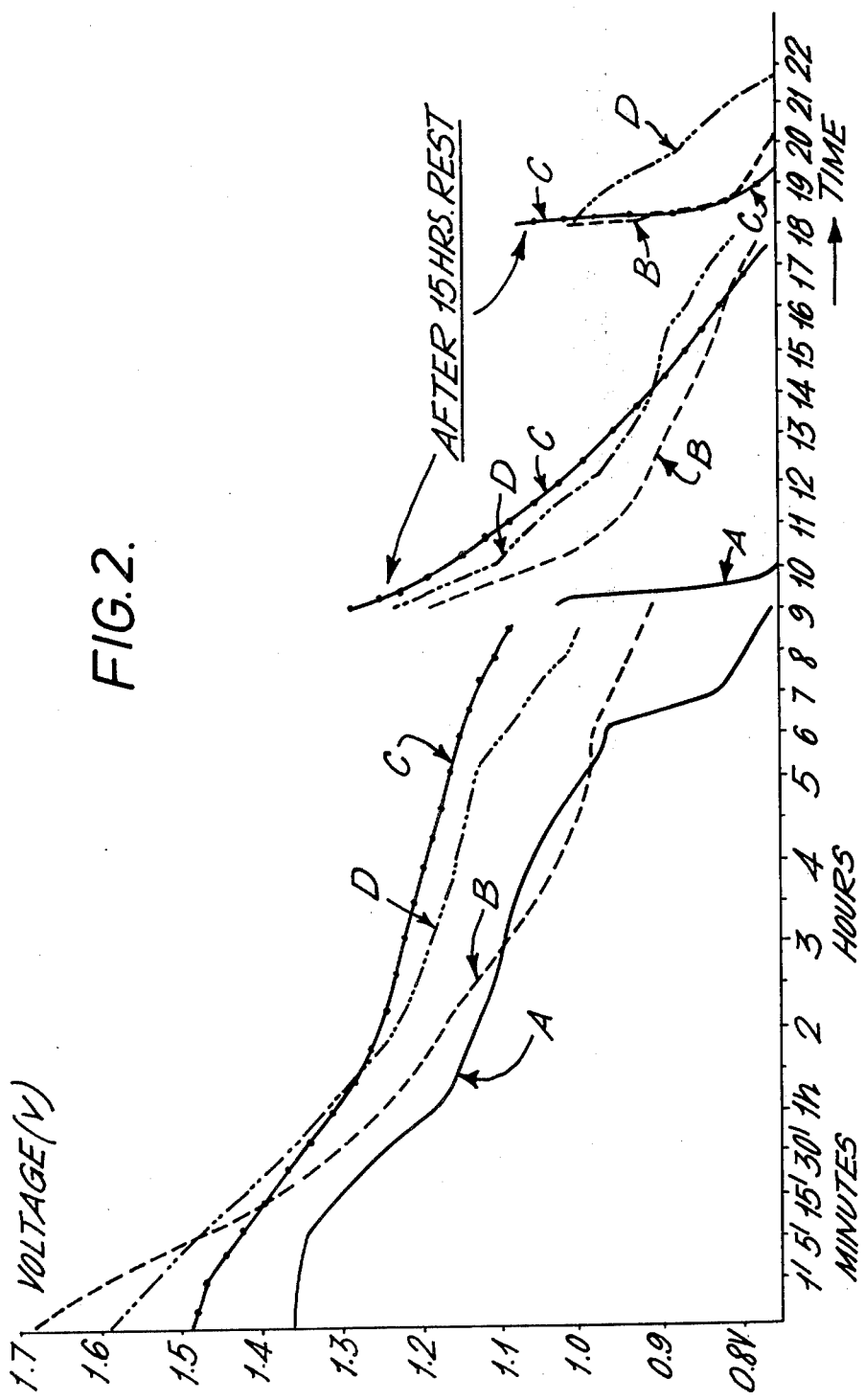

PRODUCTION OF ELECTROLYTIC MANGANESE DIOXIDE

TECHNICAL FIELD

The invention relates to electrolytic manganese dioxide (EMD) and its production.

BACKGROUND ART

Conventionally, EMD is produced by electrolysis of a manganese-containing electrolyte, such as a 0.5 to 1.2 mol/liter solution of manganous sulphate using titanium, a lead alloy or carbon as anode. The reaction scheme is:

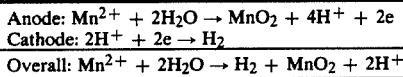

Anode: $Mn^{2+} + 2H_2O \rightarrow MnO_2 + 4H^+ + 2e$
Cathode: $2H^+ + 2e \rightarrow H_2$
Overall: $Mn^{2+} + 2H_2O \rightarrow H_2 + MnO_2 + 2H^+$ An adherent layer of EMD is deposited on the anode and when the thickness of the deposit reaches 10–30 mm or more, the anode is pulled out of the cell and stripped by impact, i.e. by hammering or even using an explosive. After cleaning and reactivation when necessary, the anode is replaced in the cell and electrolysis is resumed. The EMD obtained is in the form of a large, hard block which is dried, crushed, washed and submitted to further treatment to end up with a powder suitable for use as a dry cell depolarizer.

As pointed out in U.S. Pat. No. 3,855,088, in such a process the anode is taken out of the cell every 10 to 40 days for removal of the EMD deposit, but the cathode is used continuously. Because of impurities in the electrolyte, a cluster builds up on the cathode and lowers the efficiency of the process, so that operation had to be interrupted every 5 to 6 months for removal of the strongly-adherent cathode cluster. Accordingly, U.S. Pat. No. 3,855,088 proposed to facilitate removal of this cluster by, every 6 months or so, connecting the cathode as an anode for about 3 to 10 hours to deposit $MnO_2$ on to the cluster. This was found to reduce adherence of the cluster, which could then be removed, without damage to the electrode, by pulling it out of the electrolyte and applying an impact in the same way as the block of EMD is removed from the anode.

It has long been recognized that the discontinuous "batch" process involving the stripping of anodically deposited EMD has serious disadvantages, including the difficulty of grinding and otherwise processing the blocks of EMD to a suitable particle size for use as a battery depolarizer. Also, removal of the deposit and reactivation cause damage to the anodes and these must be replaced after several months. Furthermore, the electrodes must be spaced apart by a distance which is sufficient to accommodate the EMD deposit and, as a consequence of the resulting high cell voltage, the process cannot be economically operated at current densities above about 200 $A/m^2$.

One unsuccessful attempt to obviate these disadvantages was the electrolysis of manganous nitrate using alternating current to produce particulate EMD directly in the electrolyte, without it being deposited on and removed from the anode.

Another proposal, described in U.S. Pat. No. 3,065,155, was to carry out electrolysis of an aqueous acidic solution of manganous sulphate, while agitating the electrolyte and maintaining a given concentration of $Mn^{3+}$ ions in a manner to precipitate particulate $MnO_2$ directly in the electrolyte. However, the electrolyte (containing about 350 g/l of sulphuric acid) is very corrosive, which necessitates thorough and expensive washing, and the efficiency is lower than with the conventional batch process.

DISCLOSURE OF INVENTION

The invention therefore proposes, in the manufacture of EMD, a method of detaching the EMD from an electrode on which it has been anodically deposited. This method according to the invention is characterized by cathodically polarizing said electrode.

With the electrode thus connected as cathode, when current passes through the electrolyte, it has surprisingly been found that under suitable conditions a substantial part of the deposited EMD detaches from the electrode in solid form, advantageously peeling off as flake-like particles. This flaking or peeling off of the EMD generally begins soon after reversal of the polarity and, when hydrogen evolution commences, the evolved hydrogen assists removal of the remaining EMD. We believe that this flaking or peeling off of the deposit is related to the fact that reduction of the deposited EMD begins at the electrode/deposit interface and not on the outside of the deposit; thus, when the electrode is cathodically polarized, a very thin layer of the EMD in contact with the electrode surface is reduced and this lowers the adherence of the remaining outer part of the EMD until it comes off. A possible explanation is that the resistance offered by the deposited EMD is high so that reduction takes place at the electrode/deposit interface where the $MnO_2$ is reduced. It is not necessary for this reduction of the $MnO_2$ at the interface to involve complete reduction to soluble $Mn^{2+}$ ions, but it may produce mainly a hydrated $Mn^{3+}$ species so that removal of the deposit can be achieved without any appreciable loss of deposited manganese. The presence of a small quantity of e.g. a hydrated $Mn^{3+}$ species in the EMD product has been found beneficial to its properties.

It has been observed that at low current densities, e.g. about 50 $A/m^2$, a greater amount of the inner surface of the deposited EMD becomes reduced during the removal. Indeed, a recent publication (U.S. Pat. No. 4,087,337 issued May 2, 1978) has suggested using a brief current reversal at a very low current density (about 3–75 $A/m^2$ compared to about 1500 $A/m^2$ during normal operation) as a method of removing (i.e. dissolving) unwanted anodic manganese deposits on the anodes of cells used for the electrolysis of brackish sea water contaminated with more than about 10 ppb of manganese. To avoid undue losses by cathodic reduction, the method of removal according to the invention is usually carried out by passing current through the cathodically polarized electrode (or electrodes, where more than one are used) at a current density of at least 100 $A/m^2$. In many instances, the method of removal will involve a current density of 200 $A/m^2$ or more, and sometimes advantageously 500 $A/m^2$ or more. Also, when removal is carried out, the anodically deposited EMD will preferably have a minimum thickness such that the outer part of the deposit which detaches and is recovered forms a substantial part of the deposit. For example, using a current density of about 500 $A/m^2$ for the removal, the deposit thickness would preferably be 50 microns or more. All numerical values of deposit thickness are given as average values based on the amount of deposited EMD related to the geometrical area of the electrode.

According to another aspect of the invention, a process of producing EMD, comprising electrolyzing a manganese-containing aqueous electrolyte between electrodes to deposit EMD on the electrode(s) acting as anode, is characterized by reversing the polarity of the electrodes. The polarity is reversed when the EMD deposit on the electrode(s) acting as anode has built up to a chosen thickness such that after the polarity is changed a substantial part of the deposited EMD detaches from said electrode(s).

This thickness can be chosen within a fairly wide range, and the optimum deposit thickness before reversing the current can be established empirically for the chosen operating conditions of electrode material, electrolyte concentration, current density and so forth.

This process of producing EMD is preferably carried out continuously, i.e. by periodically reversing the polarity of the electrodes each time the deposit on the anode reaches a chosen thickness. Consequently, during the removal of EMD from one electrode when it is polarized cathodically, EMD already begins to deposit on the other electrode as soon as it is connected as anode. This polarity is then maintained even after removal of the EMD from the cathode until the new deposit on the anode has reached the chosen thickness. Then the polarity is once more reversed, and so on.

The continuous process has been satisfactorily operated for deposits from 50 to 1500 microns thick although, by choosing appropriate working conditions, it may be possible to operate the process for even thinner or thicker deposits. Working at a current density of about 500 A/m$^2$ (possibly increased during the removal phase, e.g. momentarily increased to about 5000 A/m$^2$), a suitable thickness is from 100 to 200 microns; this thickness range corresponds to reversing the current about every 25 to 50 minutes.

By operating continuously in this way, it has been possible to produce EMD at a considerably higher current density than that used in the conventional batch process, since the electrodes can be placed relatively close to one another because the deposit is not allowed to grow so thick. Also, the EMD peels off in the form of flake-like particles which can easily be ground to a fine powder having excellent properties as a battery depolarizer.

In a variation of the process of producing EMD according to the invention, the polarity of the electrodes is reversed only for a relatively short period (e.g. 1 to 5 minutes) just sufficient to detach the EMD deposit. When all or substantially all of the deposit has come off, the normal polarity is reinstated (e.g. for 20 minutes to several hours) to build up another deposit of EMD on the same electrode(s) as before.

It is also possible to carry out the process of producing EMD according to the invention by a somewhat modified procedure which involves reversing the polarity of only those electrodes which are connected as anode to deposit EMD thereon, using one or more auxiliary electrodes connected as anode during the removal phase. When the deposit on the anodically-polarized main electrode(s) has built up to the chosen thickness, these electrode(s) are connected as cathode and the auxiliary electrode(s) connected as anode. During this removal phase, the or each electrode originally connected as cathode is simply disconnected. When the EMD deposit has come off, the or each auxiliary electrode is disconnected and the original polarity of the "main" electrodes is re-established. From time to time, when the EMD deposited on the auxiliary electrode(s) has reached a selected thickness, it can be removed by connecting the auxiliary electrode(s) as cathode.

A surprising effect obtained when operating the process using a rectifier which supplies current at a substantially constant voltage is that, when the polarity is reversed, there is a current peak which increases the efficiency. When measured with an analog ammeter such current peaks appear approximately to double the current for about 15 seconds. Measurements with a digital ammeter indicate that the current peaks may typically occur during one second or less at several times the normal current. This is not liable to damage the circuit and no special requirements for the circuit and rectifier are needed.

Removal of the EMD can be speeded up, if desired, by increasing the power and hence the current density at the moment when the polarity is reversed and maintaining this higher current density either for a chosen short period, or until all or substantially all of the EMD has become detached. In this manner, reduction of the EMD is minimized and the efficiency of the process improved.

Removal of the EMD deposit can also be assisted by impact on or by vibration of the electrode when it is cathodically polarized, or shortly afterwards.

It has also been observed that detachment of the EMD is improved by leaving a "rest" period of several minutes or more at the end of the anodic deposition and before reversing the current. During this rest period, the electrodes are simply disconnected or short-circuited, but remain immersed in the electrolyte. Then, when electrolysis is resumed with reversed polarity, the EMD is found to flake off more quickly and in more uniform flakes than when the current is reversed immediately.

It is believed that the advantages observed when using a rest period are related to impregnation of the electrolyte into the pores of the deposited EMD.

When the electrodes are short-circuited during the rest period, it has been observed that a small current flows in the reverse direction (i.e. opposite that during anodic deposition), due to the potential difference generated between the electrodes, and this current (it is believed) accelerates impregnation of the electrolyte into the deposit and reduces the deposit adherence. Hence, in these conditions, the former anode is cathodically polarized without power supplied from an external source, and this effect may sufficiently loosen the deposit for it to be removed very easily by mechanical means, e.g. by a slight impact. This applies especially to thick deposits, even up to the thickness produced in the conventional process (e.g. 10–30 mm or more).

The effect produced by short-circuiting may be complemented or replaced by supplying an extremely low current (e.g. at a current density of several mA/m$^2$ to several A/m$^2$) from an external power source in the same direction as the short-circuiting current, i.e. with the former anode polarized cathodically. This extremely low current may be sufficient to accelerate transport of the electrolyte without necessarily producing any appreciable electrolytic reaction. Typically, this extremely low current will have a value of about 1/100th of the current employed for anodic deposition.

The described features of the method/process may be combined as appropriate, for example in a process involving the following steps:
  (a) anodic deposition of EMD during a period of several hours or days at quite low current density, e.g. 250 A/m² or less;
  (b) a rest period of several minutes, e.g. about 15 minutes, or possibly longer for thick deposits;
  (c) resumption of electrolysis with reversed polarity at increased current density, e.g. 500 A/m² or more for a period of several minutes sufficient to remove the EMD deposit, possibly using auxiliary electrodes connected as cathode;
  (d) reversal of current to repeat step (a), and so on.

Various materials have been found suitable as electrodes. The main desirable qualities are reversibility; inertness under anodic and cathodic conditions in the electrolyte; a surface to which the deposit does not adhere too strongly; being noncontaminating to the deposit; and being catalytic to EMD deposition and hydrogen evolution.

Suitable electrode materials (or electrode coating materials) are:
  sandblasted valve metals or alloys of valve metals such as titanium, tantalum, zirconium and niobium (preferably used at current densities below 400 A/m²);
  platinum group metals or their oxides;
  alloys or intermetallics of valve metals with platinum group metals;
  metal carbides, nitrides, borides, and sulphides;
  lead alloyed with silver and/or antimony;
  bronze oxides of the sodium tungstate type ($Na_xWO_3$, where $0 < X \leq 1$);
  mixtures or mixed crystals of one or more platinum group metal oxides with one or more valve-metal oxides, possibly stabilised by other metal oxides such as $SnO_2$, $Sb_2O_5$ or rare earth metal oxides. An iridium oxide/tantalum oxide mixed crystal coating is very catalytic for $MnO_2$ formation and hydrogen evolution and operates with a very low power consumption;
  high density graphite; and
  titanium coated with graphite.

The invention also concerns EMD obtained by the method and process according to the invention as set out above, i.e. which has been detached from an electrode on which it was anodically deposited by cathodically polarizing the electrode, the removal possibly being assisted by mechanical means such as vibration of the electrode, or impact. As mentioned above, this EMD advantageously detaches from the electrode as flake-like particles which can easily be ground to a powder. The invention also concerns EMD powder obtained this way, suitable for use as a depolarizer in primary cells. It has been observed that the density of the product varies with the pH of the electrolyte. By using a slightly acidic or a non-acidic electrolyte, high density EMD can be obtained.

A further aspect of the invention is the apparatus for carrying out the process according to the invention. Such an apparatus comprises an electrolytic cell including a plurality of electrodes immersed, in use, in a manganese-containing electrolyte, a rectifier for supplying current to the electrodes, and means for reversing the polarity of the electrodes at selected times or when the anodically-deposited EMD has reached a selected thickness. The cell preferably further comprises means for extracting EMD which has been detached from the electrodes.

BRIEF DESCRIPTION OF DRAWINGS

In the accompanying drawings:
FIG. 2 is a graph showing the discharge curves of several Leclanché cells, including one made with an EMD depolarizer obtained by the process according to the invention.

BEST MODES FOR CARRYING OUT THE INVENTION

Figure 1:
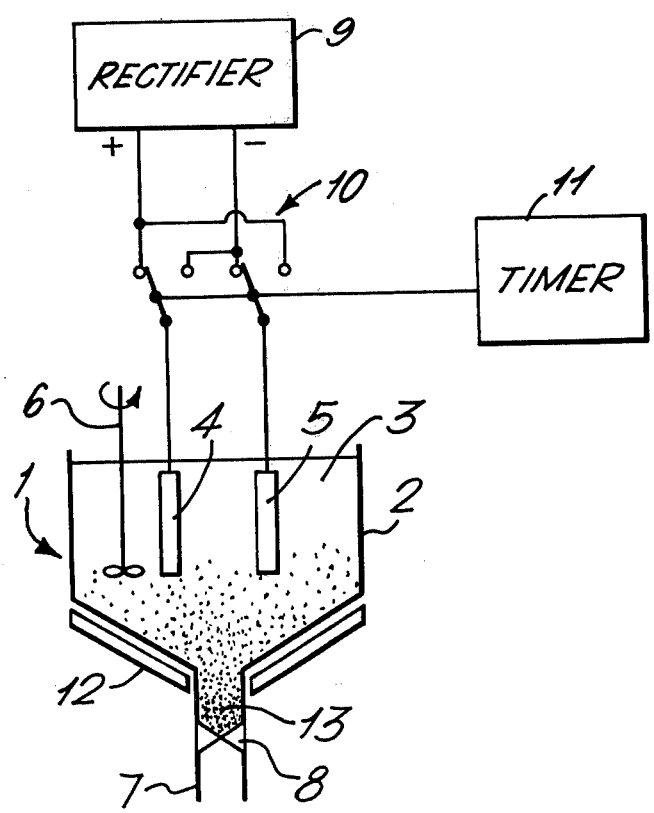
FIG. 1 schematically shows, by way of example, a simple apparatus for carrying out the process according to the invention.

The apparatus shown in FIG. 1 comprises an electrolytic cell 1 having a tank 2 of a manganese-containing aqueous electrolyte 3 in which two electrodes 4, 5 and a stirrer 6 are immersed. The bottom of the tank 2 is funnel-shaped and has a central outlet 7 fitted with a valve 8. The electrodes 4, 5 are supplied with d.c. from a rectifier 9 via a switch 10 controlled by a timer 11 by which the polarity of the electrodes is reversed after selected periods. The apparatus further comprises a thermostatically-controlled heater 12 for maintaining the electrolyte 3 at a chosen temperature, from room temperature to about 100° C. It may also comprise means for periodically adding manganese, e.g. in the form of manganous carbonate, to the electrolyte 3 to hold the concentration constant; however, for laboratory purposes, this can be done manually.

Several examples of carrying out the process according to the invention using the apparatus of FIG. 1 will now be given.

EXAMPLE I

Two electrodes each consisting of a titanium plate measuring $125 \times 75 \times 2$ mm and coated over its entire surface with a mixed-crystal material of $RuO_2$ and $TiO_2$ in the molar ratio 30:70, containing 8 g Ru/m², were connected in the cell of FIG. 1. The electrolyte, an aqueous solution containing 1 M.$MnSO_4H_2O$ and 0.5 M.$H_2SO_4$, was held at 95° C. and the timer 11 was set to reverse the polarity of the electrodes every 50 minutes. Current was supplied at a density of 500 A/m², this current density being maintained constant. Operation was continued for just over 250 minutes (i.e. 5 complete cycles), with manganous carbonate being added at the rate of 2.1 g/Ah.

During each 50 minute cycle, EMD deposited on the anode to a calculated thickness of 200 microns. Each time the polarity was reversed, the EMD began to peel off this electrode (now the cathode). After a short period, bubbles of hydrogen were evolved and the remaining EMD peeled off the electrode.

The product, in the form of flake-like particles 13, settled in the bottom of the tank 2 and, at the end of the operation, was removed via the valve 8. These particles were then washed in distilled water until free of acid (to a pH of about 6–7), dried at 120° C. for 15 hours, and weighed. By comparison with the theoretical weight of EMD deposited, the overall efficiency was calculated to be 90%.

EXAMPLES II–VII

Example II–VII were carried out in a similar manner to Example I, varying the electrode material, electrolyte and other parameters. All electrodes had the same dimensions as before, except those of Examples VI and VII which measured 30×40×2 mm. The results are summarized in Table I in which "c.c." signifies operation at constant current, "c.p." signifies operation involving current peaks when the polarity is reversed and "H.E.T." signifies "hydrogen evolution time", i.e. the time after reversal of polarity for the cathodically polarized electrode to drop to the potential at which hydrogen is evolved.

TABLE I

| Example No. | II | III | IV |
|---|---|---|---|
| Electrode | Ti/Pd alloy 0.2% by wt Pd | Same as Example I | Ti coated with 2$\mu$ Pt |
| Electrolyte | 2M.MnSO$_4$ 4H$_2$O | " | 2M.MnSO$_4$H$_2$O |
| Current Density | 300 A/m$^2$ (c.p.) | 500 A/m$^2$ (c.c.) | 500 A/m$^2$ (c.p.) |
| Temperature | 95° C. | 95° C. | 95° C. |
| Cycle Time | 83 min | 25 min | 50 min |
| Calculated Thickness (microns) | 200 | 100 | 200 |
| No. of Cycles | 3 | 5 | 2 |
| Efficiency | 99.5 | — | — |
| H.E.T. | 75 sec | 5 mins | 72 sec |

| Example No. | V | VI | VII |
|---|---|---|---|
| Electrode | Lead | Same as Example IV | Same as Example IV |
| Electrolyte | 1M.MnSO$_4$H$_2$O + 0.5M.H$_2$SO$_4$ | 2M.MnCl$_2$4H$_2$O + 0.01M.HCl | 1M.Mn(NO$_3$)$_2$ + 0.01M.HNO$_3$ |
| Current Density | 500 A/m$^2$ (c.p.) | 500 A/m$^2$ (c.p.) | 500 A/m$^2$ (c.c.) |
| Temperature | 95° C. | 93° C. | 95° C. |
| Cycle Time | 50 min | 28 min | 25 min |
| Calculated Thickness (microns) | 200 | 112 | 100 |
| No. of Cycles | 4 | 2 | 2 |
| Efficiency | — | — | — |
| H.E.T. | 9 mins | 100 sec | 5 mins |

EXAMPLE VIII

Using electrodes similar to those of Example IV, consisting of a titanium plate subjected to etching for 6 hours in oxalic acid at 90° C. and coated with a 2-micron thick layer of platinum metal, several further runs were carried out with the electrodes spaced apart by 2 cm. The results are reported in Table II, in which $E_{cell}$ signifies the cell voltage.

TABLE II

| Electrolyte | 2M.MnSO$_4$ + 0.25M.H$_2$SO$_4$ | 2M.MnSO$_4$ + 0.25M.H$_2$SO$_4$ | 2M.MnSO$_4$ + 1M.H$_2$SO$_4$ | 1.5M.MnSO$_4$ + 0.25M.H$_2$SO$_4$ |
|---|---|---|---|---|
| Current Density | 500 A/m$^2$ | 500 A/m$^2$ | 500 A/m$^2$ | 1000 A/m$^2$ |
| Temperature | 95° C. | 95° C. | 95° C. | 95° C. |
| Cycle Time | 25 mins | 2 hours | 2 hours | 1 hour |
| Calculated thickness (microns) | 100 | 480 | 480 | 480 |
| Efficiency | 90% | 95% | 75% | 60% |
| $E_{cell}$ | 2.2 V | 2.2 V | 2.1 V | 3 V |
| Tested during | 1 month | 100 cycles | 1 day | 1 day |

EXAMPLE IX

The procedure of the preceding Examples was followed using electrodes consisting of plates of zirconium which was sandblasted and coated with a 2-micron thick layer of platinum metal. The electrolyte was 2 M.MnSO$_4$ plus 0.25 M.H$_2$SO$_4$ at 95° C. and the current density 250 A/m$^2$ at a constant cell voltage of 2.0–2.1 V. The current reversal time was progressively increased from 5 minutes to 16 hours, to vary the calculated EMD deposit thickness from 10 micron to 1920 micron. For the five-minute cycle, the efficiency after 20 hours operation was 14%, but this efficiency increased rapidly with increasing reversal time. With a 2-hour cycle, the efficiency after 30 cycles was 90%. With an 8-hour cycle, the EMD deposit continued to peel off during 5 days of testing (15 cycles), whereas when the cycle time was increased to 16 hours, operation continued for only 4 cycles.

EXAMPLE X

A similar procedure was repeated using electrodes consisting of sandblasted tantalum coated with a 2-micron thick layer of platinum metal, at a current density of 200 A/m$^2$ in an electrolyte containing 1 M.MnSO$_4$ and 0.5 M.H$_2$SO$_4$ and with a cycle time of 4 hours (calculated EMD deposit thickness = 384 micron). The efficiency after 7 days testing was 88%.

EXAMPLE XI

Electrodes were prepared by etching titanium plates, applying a 2-micron thick coating of rhodium metal and then heating in a helium atmosphere at 400° C. The procedure of the previous Examples was followed, using an electrolyte containing 2 M.MnSO$_4$ and 0.25 M.H$_2$SO$_4$ with a current density of 150 A/m$^2$ and a cycle time of 3 hours (calculated EMD deposit thickness=216 micron). The efficiency after 265 hours testing was 85%.

EXAMPLE XII

A similar procedure was repeated using plain, unetched titanium electrodes in an electrolyte containing 2 M.MnSO$_4$ and 0.25 M.H$_2$SO$_4$. The current density was 100 A/m$^2$ and the cycle time 3 hours (calculated EMD deposit thickness=144 micron). The electrodes broke down after 3 days; the efficiency was 85%.

EXAMPLE XIII

The electrodes of Example VIII were used in an electrolyte consisting of 2 M.MnSO$_4$ and 0.25 M.H$_2$SO$_4$ at 85° C. with a current density of 150 A/m$^2$ and a cycle time of 3 hours. When the current was reversed, it was observed that the EMD deposit began to peel off after 12 minutes. The procedure was repeated, but with a rest period at the end of each 3 hour period of electrolysis, during which the electrodes were disconnected. The rest period was varied from 5 minutes to 1 hour. After each later recommencement of electrolysis, it was found that the EMD began to peel off after a shorter time than before, this time progressively dropping to 1½ minutes after a 30-minute rest period. The procedure was then repeated again, but with the electrodes short-circuited across a 10 Ohm resistance during rest periods of 5 minutes to 1 hour. For the same rest periods, peeling-off began on average about 1 minute earlier than before. For the 30-minute rest period, peeling-off began 1 minute after recommencing electrolysis.

EXAMPLE XIV

Electrolysis was carried out as in Example XIII, but at a current density of 75 A/m$^2$ for a continuous period of 80 hours. An impact was applied to the electrodes, but the deposit remained in place. Then the electrodes were directly short-circuited for 1 hour. During this period, a current of about 5 A/m$^2$ flowed from the former anode to the former cathode. The deposit again remained in place when a further impact was applied. Current was then supplied in the same direction as the self-generated short-circuit current, at a current density of 25 A/m$^2$ for 15 minutes; the deposit still remained adherent after an impact was applied. Finally, this current was increased to 500 A/m$^2$ for 2 minutes. The electrodes were removed and the deposit came off easily in the form of two slabs each about 3¼ mm thick, when a slight impact was given.

EXAMPLE XV

An electrolyte containing 2 M.MnSO$_4$ and 0.25 M.H$_2$SO$_4$ was heated to 90°-95° C. and electrolysis was carried out between two electrodes consisting of titanium coated with tantalum-iridium oxides. The current density applied was 500 A/m$^2$ and the current was reversed every 30 minutes. After 150 cycles, the deposit still flaked off very easily and was found to be a good battery quality EMD.

A further 15 runs were carried out using various electrode materials at 500 A/m$^2$. One electrode was weighed before each run and, after operation for 25 minutes as anode, was removed from the cell, dried and weighed again. then the electrode was replaced in the cell and connected as cathode at 500 A/m$^2$ until the EMD deposit had peeled off. The product was collected, washed, dried and weighed. In each case, the weight of the product was at least 90% of the measured weight of EMD deposited, and never less than 85% of the theoretical weight of EMD deposited.

It has been found that the quantity of EMD which is reduced during the cathodic polarization depends on the current density. Several layers of anodically-deposited EMD having the same thickness were detached from the same electrode by connecting it as cathode at different current densities. Each time the EMD flaked off, and was collected and weighed after drying. The amount obtained (called weight a which is considered as being the yield after one cycle), is compared with the theoretically-calculated amount of EMD deposited, called weight b. The ratio of weight a to weight b expressed in percent is called the efficiency, and a graph was plotted of efficiency against current density. This graph showed that the efficiency increased with current density and that, to obtain a good efficiency for these particular operating conditions, the current density during the removal phase should be at least 400 A/m$^2$.

INDUSTRIAL APPLICABILITY

A sample of the EMD produced in Example I was subjected to x-ray analysis, which revealed a well-defined gamma crystal structure. No other crystal phases were detected. Samples prepared using a platinum-coated titanium electrode as in Example IV, but with an electrolyte consisting of 1 M.MnSO$_4$.H$_2$O with 0.5 M.H$_2$SO$_4$ and using current densities of 500 A/m$^2$ and 1000 A/m$^2$, were also subjected to x-ray analysis. Both had gamma crystal structure with no other crystal phases present.

A paper-lined Leclanché-type dry battery cell having an NH$_4$Cl electrolyte was made with a depolarizer formed of finely ground EMD prepared according to Example I. The cathode consisted of a mixture of 40 g of this EMD powder, 4 g of acetylene black and 6 g NH$_4$Cl. To this mixture was added 20 ml of an electrolyte consisting of 18% by weight NH$_4$Cl, 16% ZnCl, 0.04% HgCl$_2$ and 65.96% H$_2$O. The cell was subjected to a discharge test at 4.7 Ohm and ambient temperature. The same test was simultaneously carried out on similarly manufactured cells using chemical MnO$_2$ and standard EMD as depolarizer, as well as with three comparable commercially purchased cells of recent manufacture. The cells were allowed to discharge for 9 hours, then allowed to rest for 15 hours, and this procedure was repeated. The voltage of each cell during discharge was measured and the results are shown in FIG. 2 in which curve A shows the average voltage for the three purchased cells; curve B relates to the cell with chemical MnO$_2$; curve C, the cell with standard EMD; and curve D, the cell with EMD produced according to the invention. It can be seen that the last cell (curve D) has an excellent life and that the EMD product can be employed industrially with prospects of considerable economic advantages, in the manufacture of primary cells and in all other industrial uses requiring high grade manganese dioxide.

To summarize, the method, process, apparatus and product according to the invention have the following features and advantages or potential advantages:

(a) The method of removing anodically-deposited EMD can be used even if the EMD has been deposited in the conventional manner at low current density, below 200 A/m², and even if the deposit has a substantial thickness.

(b) The process of producing EMD can advantageously be operated at higher current densities than the conventional batch process, i.e. above 200 A/m².

(c) It is also possible to operate the process at low current density (below 200 A/m²) during most of the depositing phase, increasing the current density only during the removal phase.

(d) The process and method can be operated for various electrode materials and in various operating conditions (electrolyte, current density, electrode spacing, deposit thickness, temperature, additives to the electrolyte) which can be optimized to obtain an excellent product at high efficiency.

(e) By periodically removing the EMD deposit before its thickness builds up substantially, the inter-electrode gap in the cell can be made considerably less than that used conventionally to accommodate a deposit of up to 30 mm or more. This will enable an appreciable saving of power.

(f) An excellent product can be obtained in the form of small flake-like particles which are easy to grind to a powder.

We claim:

1. In the manufacture of electrolytic manganese dioxide (EMD), a method of detaching the EMD from an electrode on which it has been anodically deposited, characterized by cathodically polarizing said electrode.

2. The method of claim 1,
characterized in
that the current is passed through the cathodically polarized electrode at a current density of at least 100 A/m² to detach a substantial part of the deposited EMD.

3. The method of claim 2,
characterized in
that the current density during removal of the EMD is at least 500 A/m².

4. The method of claim 1,
characterized in
that the deposited EMD is contacted with electrolyte so as to impregnate the EMD deposit with electrolyte before the electrode is cathodically polarized in order to effect removal of the EMD.

5. The method of claim 1, 2, 3 or 4,
characterized in
that removal of the EMD deposit is assisted by impact or by vibration.

6. In the manufacture of electrolytic manganese dioxide (EMD) by electrolyzing a manganese-containing aqueous electrolyte between electrodes, to deposit EMD on the electrode(s) acting as anode, and detaching the EMD deposit from said electrode(s) in the form of a solid product for further processing, an improved method of detaching the EMD deposit from said electrode(s),
the method being
characterized by cathodically polarizing said electrode(s).

7. The method of claim 6,
characterized in
that the electrode(s) is or are cathodically polarized by short circuiting with the other electrode(s).

8. The method of claim 6,
characterized in
that the electrode(s) is or are cathodically polarized after a rest period during which the electrode(s) is or are disconnected.

9. The method of claim 6, 7 or 8,
characterized in
that removal of the EMD deposit is assisted by impact or by vibration.

10. A process of producing electrolytic manganese dioxide (EMD), comprising electrolyzing a manganese-containing aqueous electrolyte between electrodes to deposit EMD on the electrode(s) acting as anode,
characterized by
reversing the polarity of at least the electrode(s) connected as anode to detach a substantial part of the deposited EMD from said electrode(s).

11. The process of claim 10,
characterized in
that the polarity of the electrodes is reversed periodically at regular intervals.

12. The process of claim 11,
characterized in
that the polarity of the electrodes is reversed each time the anodic deposit reaches a thickness in the range from 50 to 1500 micron.

13. The process of claim 10,
characterized in
that the polarity of the electrodes is reversed after a given time during which an EMD deposit has built up on the anodically-polarized electrode(s) and is held reversed to detach the EMD deposit during a period shorter than said given time, whereupon the initial polarity is reinstated.

14. The process of claim 10,
characterized in
that the polarity of all the electrodes is reversed in order to detach the deposited EMD from said electrodes acting as anode.

15. The process of claim 10,
characterized in
that the polarity of only the or those electrode(s) connected as anode to deposit EMD thereon is reversed using one or more auxiliary electrodes connected as anode during the removal phase.

16. The process of claim 10,
characterized in
that the electrodes are supplied at substantially constant voltage to produce a current peak at the moment of reversal.

17. The process of claim 10,
characterized in
that electrolytic deposition of EMD is discontinued for a rest period when the anodic deposit has reached a given thickness and is resumed with reversed polarity after the rest period.

18. The process of claim 17,
characterized in
that the electrode(s) connected as anode for the deposition of EMD thereon is or are short-circuited during the rest period, with the electrode(s) which were connected as cathode.

19. The process of claim 10, 11, 12, 13, 14, 15, 16, 17 or 18,
characterized in
that removal of the EMD deposit is assisted by impact or by vibration.

20. Electrolytic manganese dioxide obtained by the method or process of claim 1, 6 or 10.

* * * * *

UNITED STATES PATENT AND TRADEMARK OFFICE
CERTIFICATE OF CORRECTION

PATENT NO. : 4,170,527
DATED : October 9, 1979
INVENTOR(S) : Henri B. Beer; Theo L. B. Muller It is certified that error appears in the above-identified patent and that said Letters Patent are hereby corrected as shown below:

On the title page; please refer to [30] Foreign Application Priority Data:

Change "Oct. 2, 1977" to read -- Nov. 2, 1977 --.

Signed and Sealed this

Thirtieth Day of September 1980

[SEAL]

Attest:

SIDNEY A. DIAMOND

Attesting Officer  Commissioner of Patents and Trademarks